US006641684B2

(12) United States Patent
Instance

(10) Patent No.: US 6,641,684 B2
(45) Date of Patent: Nov. 4, 2003

(54) METHOD OF AND APPARATUS FOR PRODUCING LABELS

(76) Inventor: David John Instance, Guinea Hall, Sellindge, Kent (GB)

( * ) Notice: Subject to any disclaimer, the term of this patent is extended or adjusted under 35 U.S.C. 154(b) by 0 days.

(21) Appl. No.: 10/108,646

(22) Filed: Mar. 29, 2002

(65) Prior Publication Data

US 2002/0096241 A1 Jul. 25, 2002

Related U.S. Application Data

(63) Continuation of application No. 09/853,606, filed on May 14, 2001, now abandoned, which is a continuation of application No. 08/922,522, filed on Sep. 3, 1997, now abandoned, which is a continuation of application No. 08/584,155, filed on Jan. 11, 1996, now abandoned, which is a continuation of application No. 08/421,027, filed on Apr. 13, 1995, now abandoned, which is a continuation of application No. 08/203,741, filed on Mar. 1, 1994, now abandoned, which is a continuation of application No. 08/044,899, filed on Apr. 7, 1993, now abandoned, which is a continuation of application No. 07/347,196, filed on May 4, 1989, now abandoned.

(30) Foreign Application Priority Data

May 11, 1988 (GB) ............................................ 8811174

(51) Int. Cl.[7] .......................... B32B 31/10; B32B 35/00

(52) U.S. Cl. ......................... 156/64; 156/250; 156/267; 156/270; 156/302; 156/362; 156/522; 156/552

(58) Field of Search .......................... 156/64, 250, 269, 156/270, 299, 300, 302, 267, 268, 361, 362, 363, 364, 367, 522, 538, 540, 541, 542, 552

(56) References Cited

U.S. PATENT DOCUMENTS 4,294,644 A * 10/1981 Anderson ................... 156/361
4,397,709 A * 8/1983 Schwenzer .............. 156/361 X
4,585,506 A * 4/1986 Matsuguchi ................ 156/361
4,680,080 A * 7/1987 Instance ................. 156/364 X
4,711,686 A * 12/1987 Instance ................. 156/268 X
4,894,106 A * 1/1990 Instance ................. 156/267 X
4,933,043 A * 6/1990 Instance ................. 156/267 X
5,262,214 A * 11/1993 Instance ................. 156/270 X
5,470,418 A * 11/1995 Instance ................. 156/267 X
5,593,749 A * 1/1997 Instance ................. 156/267 X
5,674,334 A * 10/1997 Instance ...................... 156/64
5,975,575 A * 11/1999 Instance ................. 156/250 X

FOREIGN PATENT DOCUMENTS

EP 0 154 057 * 9/1985

* cited by examiner

*Primary Examiner*—Curtis Mayes
(74) *Attorney, Agent, or Firm*—Rothwell, Figg, Ernst & Manbeck

(57) ABSTRACT

A method of producing a succession of self-adhesive labels carried on a length of release backing material, the method comprising the steps of:

(a) providing a laminar material which includes a release backing material as a lower layer and an upper layer comprised of a web of self-adhesive backed material or a layer of pressure-sensitive adhesive;

(b) depositing a succession of pre-printed labels onto the upper layer of the laminar material and adhering the pre-printed labels thereto, the laminar material being conveyed past a label applying station; and (c) cutting through the upper layer of the laminar material as far as the release backing material thereby to form the required self-adhesive labels; wherein the rate of deposition of the pre-printed labels onto the upper layer is controlled by detecting the position of pre-printed labels which have been deposited onto the laminar material, comparing the detected position with a desired position of the pre-printed labels and changing the said rate of deposition in response to that comparison. The present invention also provides an apparatus for use with the method.

10 Claims, 6 Drawing Sheets

METHOD OF AND APPARATUS FOR PRODUCING LABELS

CROSS-REFERENCE TO RELATED APPLICATIONS

This is a continuation of application Ser. No. 09/853,606, filed May 14, 2001, abandoned, which is a continuation of application Ser. No. 08/922,522, filed Sep. 3, 1997, abandoned, which is a continuation of application Ser. No. 08/584,155, filed Jan. 11, 1996, abandoned, which is a continuation of application Ser. No. 08/421,027, filed Apr. 13, 1995, abandoned, which is a continuation of application Ser. No. 08/203,741, filed Mar. 1, 1994, abandoned, which is a continuation of application Ser. No. 08/044,899, filed Apr. 7, 1993, abandoned, which is a continuation of application Ser. No. 07/347,196, filed May 4, 1989, abandoned.

BACKGROUND TO THE INVENTION

The present invention relates to a method of and an apparatus for producing labels.

UK-A-2122968 and UK-A-2127378 each disclose a method of producing a succession of self-adhesive labels carried on a length or release backing material. A succession of pre-printed labels is adhered to a web of paper which is releasably adhered to a release backing material. The web of paper, optionally together with the pre-printed labels, is then die cut to form the resultant labels. Those methods encounter a problem due to stretching of the web of paper during the production method and/or during an earlier pre-printing process in which the web of paper is pre-printed with a succession of images. This stretching can result in the applied pre-printed labels being inaccurately positioned on the web of paper.

UK-A-2185366 discloses a computer controlled horizontal wrapping machine which produces hemetically sealed packages. EP-A-0085418 discloses a method and apparatus for applying self adhesive labels to articles to be labelled. EP-A-0019718 discloses a position control system for a moving web. US-A-4070226 discloses a registration system for bringing a plurality of moving articles into registration with each other.

The present invention aims to overcome this problem of the prior art.

SUMMARY OF THE INVENTION

Accordingly the present invention provides a method of producing a succession of self-adhesive labels carried on a length of release backing material, the method comprising the steps of:

(a) providing a laminar material which includes a release backing material as a lower layer and an upper layer comprised of a web of self-adhesive backed material or a layer of pressure-sensitive adhesive;

(b) depositing a succession of pre-printed labels onto the upper layer of the laminar material and adhering the pre-printed labels thereto, the laminar material being conveyed past a label applying station; and (c) cutting through the upper layer of the laminar material as far as the release backing material thereby to form the required self-adhesive labels; wherein the rate of deposition of the pre-printed labels onto the upper layer is controlled by detecting the position of pre-printed labels, comparing the detected position with a desired position of the pre-printed labels and changing the said rate of deposition in response to that comparison.

The pre-printed labels may be detected either before or after they have been deposited onto the laminar material.

The present invention further provides an apparatus for producing a succession of self-adhesive labels carried on a length of release backing material, the apparatus comprising means for depositing at a label applying station a succession of pre-printed labels onto the upper surface of a laminar material, which includes a lower layer of a release backing material and an upper layer comprised of a web of self-adhesive backed material or a layer of pressure-sensitive adhesive, the pre-printed labels being adhered to the laminar material, means for conveying the laminar material past the label applying station, a cutting device for cutting through the upper layer of the laminar material as far as the release backing material thereby to form the required self-adhesive labels, means for detecting the position of pre-printed labels, means for comparing the detected position with a desired position of the pre-printed labels, means for controlling the said depositing means in response to the means for comparing thereby to change the rate of deposition of the pre-printed labels onto the upper layer.

The detecting means may be located either upstream or downstream of the label applying station, with the detecting means being arranged to detect the position of pre-printed labels either before or after, respectively, those labels have been deposited onto the laminar material.

BRIEF DESCRIPTION OF THE DRAWINGS

Embodiments of the present invention will now be described by way of example only, with reference to the accompanying drawings, in which.

DESCRIPTION OF THE PREFFERED EMBODIMENTS

Figure 1:
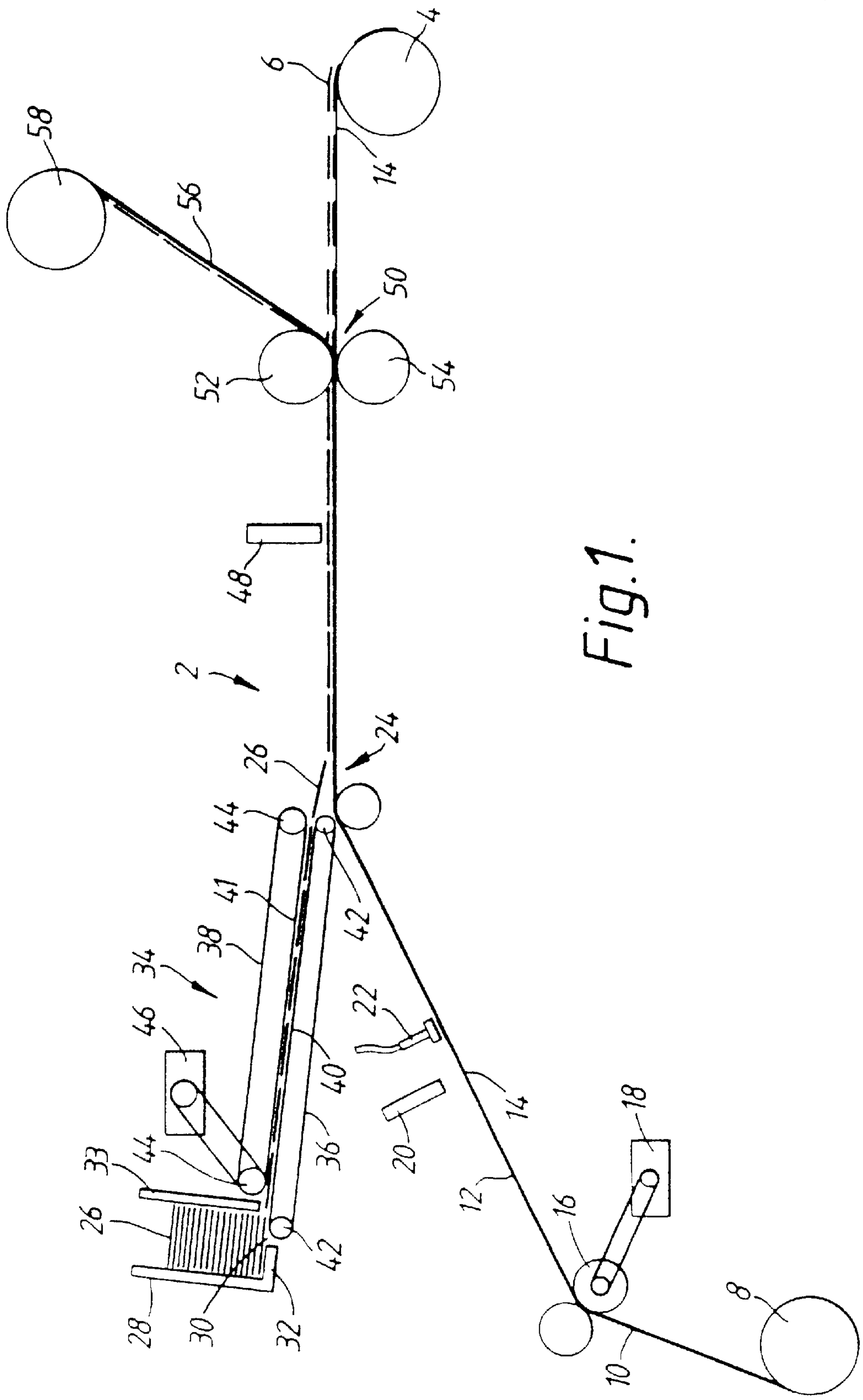
FIG. 1 is a schematic diagram of an apparatus for producing labels in accordance with a first embodiment of the present invention.

Referring to FIG. 1, there is shown an apparatus, designated generally as 2, for preparing a reel 4 carrying a succession of self-adhesive labels 6. The reel 4 of labels is produced starting from a reel 8 of a laminar material 10 commonly known in the art as self-adhesive stock or pressure-sensitive stock.

Such laminar material 10 usually consists of a web of paper 12 of indeterminate length coated on its reverse side with a layer of pressure sensitive adhesive, with the adhesive side of the paper being carried on a backing layer 14 of a release material such as a silicone-faced backing paper. The upper surface of the web of paper 12 is printed along its length with a succession of images, each of which is to constitute the front surface of a respective resultant label 6.

Alternatively, the web of paper 12 may not be so printed; such an arrangement is employed when the front surface of the resultant self-adhesive labels 6 is to be composed only of the front surface of a pre-printed label which is adhered to the web of paper in the manner which is described hereinbelow.

The laminar material is fed out from the reel 8 by a pair of opposed drive rollers 16, one of which is driven, e.g. by means of a belt, at a predetermined constant rotational speed by a web drive unit 18. The laminar material 10 passes through the pair of opposed drive rollers 16 and then passes under a photodetector 20 which constitutes a web sensor. The web sensor 20 is arranged to detect each of a series of given points on the laminar material 10. For example, the web sensor is arranged to detect a series of marks which are printed on the upper surface of the web of paper 12.

The laminar material 10 then passes under an adhesive applicator 22. The adhesive applicator 22 deposits a layer of adhesive across all or some of the width of the web of paper 12 as the laminar material 10 passes thereunder. The adhesive applicator includes an applicator head which is elongate and extends transverse the direction of movement of the web of paper 12. The adhesive applicator 22 expresses a series of longitudinal beads of adhesive onto the web of paper 12. The adhesive may be any suitable adhesive for paper such as, for example, PVA (poly vinyl alcohol) adhesive. The adhesive applicator is arranged to operate either continuously, when a continuous layer of adhesive on the web of paper 12 is desired, or periodically. For periodic operation, the adhesive applicator 22 is switched on in response to a detection signal from the web sensor 20 which causes adhesive to be deposited onto the web of paper 12 at the desired moment and for a predetermined period. This provides a succession of areas of adhesive on the web of paper 12 at the desired locations in relation to printed regions on the web and of the desired dimensions in relation to the pre-printed labels to be applied thereto subsequently.

Laminar material 10 is then conveyed to a label applying station 24 at which a series of pre-printed labels 26 are applied in turn to the adhesive on the web of paper 12 by being deposited thereon by means of a label delivery system. A plurality of the pre-printed labels 26 are held as a stack thereof in a magazine 28. The pre-printed labels may be, for example, multiple ply labels as described in my GB-A-2115775 and my GB-A-2141994 or they may take the form of a sheet of instructions and an envelope therefor as described in my GB-A-2115744 or in my GB-B-1475304. Alternatively, the pre-printed labels may be lithographically printed labels as disclosed in my GB-A-2122968. The bottom of the magazine 28 includes an opening 30 in the bottom wall 32 thereof which extends transversely across the magazine 28 from approximately the middle of the magazine 28 to the front wall 33 of the magazine 28.

The label delivery system includes two opposed endless belts 36, 38 which are mounted one above the other to provide two opposing belt surfaces 40, 41. The endless belts 36, 38 are each mounted about a pair of respective rollers 42, 44. One roller 42 of the lower endless belt 36 is mounted beneath the opening 30 in the magazine 28 whereby one end of the upper surface 40 of the lower endless belts 36 engages the bottom pre-printed label 26 in the stack. The endlesss belt 36, 38 are driven continuously by a label drive unit 46 whereby the lower endless belt 36 shown in FIG. 1 is driven in a clockwise direction and the upper endless belt 38 shown in FIG. 1 is driven in an anticlockwise direction. The label drive unit 46 may be connected to the endless belts 36, 38 either directly or via a belt-drive arrangement. The label drive unit 46 may drive both endless belts 36, 38, or one of the endless belts 36, 38 with a suitable gear connection being made between the two endless belts 36, 38, so that in use, both are continuously rotated at the same speed. The label delivery system 34 continuously feeds a succession of the pre-printed labels 26 from the magazine onto the adhesive coated web of paper 12. The label delivery system may be adapted so that the pre-printed labels are in substantially abutting relationship on the web of paper 12 or are in spaced relationship on the web of paper 12.

The succession of pre-printed labels 26 on the web of paper 12 then passes under a label sensor 48 which is adapted to detect a particular part of each pre-printed label 26, e.g. a registration mark printed on each pre-printed label 26 or the leading edge of each pre-printed label 26. If desired, the label sensor 48 may be employed to control the adhesive applicator 22 rather than the web sensor 20.

The succession of pre-printed labels 26 then passes to a die-cutting station 50 comprising a die-cutting roller 52 and an opposed backing roller 54. The die-cutting roller 52 is adapted to cut out from each pre-printed label 26 adhered on the web of paper 12 a resultant label 6 by cutting through the pre-printed label 26 and the web of paper 12 as far as the backing 14 of release material. The backing 14 of release material is not itself cut by the die-cutting roller 52. The waste web remnant 56, comprising the waste portions of the web of paper 12 and the pre-printed labels 26, is stripped off from the backing 14 of release material at the downstream side of the die-cutting roller 52 and is wrapped into a reel 58. The backing 14 of release material carrying thereon the succession of resultant labels 6 is wrapped onto the reel 4. The reel 4 may subsequently be mounted in an automatic labelling machine which strips off the resultant labels 6 from the backing 14 of release material and applies them in succession to containers or other articles to be labelled.

The control system of the label producing apparatus of FIG. 1 will now be described with reference to FIG. 2. The web drive unit 18 comprises a main motor 64 which drives the drive rollers 16. A speed setter 66 inputs a digital signal into the main motor 64 represenative of the desired motor speed. The main motor 64 is connected to an encoder 68 which is adapted continuously to output a series of pulses, the instantaneous rate of which is related to the actual speed of the main motor 64. The pulses are received by a motor control 69 which compares the instantaneous pulse rate with the rate of the desired set speed and if there is a difference in those two rates, the motor control 69 outputs a feedback signal which is received by the main motor 64 and instantaneously corrects the speed of the main motor 64. This feedback control provides continuous instantaneous control of the speed of the main motor 64 so that at any given time the actual speed is the same as the desired set speed.

The encoder 68 also outputs a pulse signal, comprising a series of pulses at a particular rate, to a pulse counter 70. Each pulse is representative of a specific angular rotation of the main motor 64 and thus is representative of a specific distance which the laminar material 10 has moved as a result of being driven by the main motor 64.

The pulse counter 70 emits an output of a series of pulses to a ratio selector 72. However, in an alternative arrangement, the output of pulses could be outputted directly to the ratio selector 72 from the encoder 68. The ratio selector 72 can be set to a predetermined ratio, typically to four decimal places, so that the pulse rate output therefrom is the predetermined ratio of the pulse rate input from the pulse counter 70. The output of pulses from the ratio selector is fed to a motor control 74 for a feed motor 76 of the label drive unit 46. The motor control 74 outputs a pulsed motor control signal to the feed motor 76, and the feed motor 76 rotates at a speed governed by the pulse rate of the pulsed motor control signal. In this way, the pulsed motor control signal controls the feed motor 76 and thereby the rate at which pre-printed labels 26 are delivered onto the laminar material 10 by the label delivery system 34. In a manner similar to that of the main motor 64, the feed motor 76 is connected to an encoder 78 which is adpated continuously to output a series of pulses, the instantaneous rate of which is related to the actual speed of the feed motor 76. The pulses are received by the motor control 74 which compares the instantaneous pulse rate with the rate of the desired set speed which is represented by the pulsed motor control signal outputted from the motor control 74. If there is a difference in the two pulse rates, the motor control 74 outputs a feedback signal, which may be positive or negative depending on whether the feed motor 76 is running slow or fast, which is processed by the motor control 74. The feedback signal is added arithmetically to the pulsed input from the ratio selector 72 to form the pulsed motor control signal which is fed to the feed motor. Thus the pulsed motor control signal may be continuously varied to ensure that the feed motor 76 is running at a speed which is at the desired ratio of the speed of the main motor 64. It will be understood that the motor control 74 also acts as a pulsed signal accumulator.

In addition to controlling the speed of the feed motor 76 so that it runs at the selected ratio of the speed of the main motor 64, the control signal is also arranged periodically to control the feed motor 74 of the label delivery system 34 in response to the actual operation of the web drive system. Specifically, the label delivery system 34 is controlled so that pre-printed labels 26 are deposited on the laminar material 10 at the correct location irrespective of fluctuations of the position or the laminar material 10 relative to the label delivery system 34, which may result due to stretching of the laminar material 10. The position of each pre-printed label 26 which has been applied to the web of paper 12 is detected, and a resultant detection signal is employed to compare the actual position of that pre-printed label 26 on the web of paper 12 with the desired position of the pre-printed label 26 in relation to the web of paper 12. The result of that comparison is employed to effect control of the label delivery system 34 so that a subsequent, upstream, pre-printed label 26 is delivered onto the web of paper 12 at the correct location for that pre-printed label 26. This control is achieved by varying the speed of the label delivery system 34 whereby the deposition of a particular pre-printed label 26 onto the web of paper 12 is accelerated or retarded as the case may be depending on whether the detected pre-printed label 26, which has already been applied to the web of paper 12, is upstream or downstream of its desired location.

For this purpose, the control system includes the label sensor 48 which outputs a label detection signal to the pulse counter 70 when the label sensor 48 detects a particular part of a respective pre-printed label 26 on the web of paper 12. The label detection signal acts as a "start" signal for the pulse counter 70 and triggers the pulse counter 70 into counting pulses received from the encoder 68. The counted pulses are outputted to a comparator 80. The web sensor 20, described hereinabove, is arranged to detect a series of given points on the laminar material 10. When the web sensor 20 does detect one of the said given points, the web sensor 20 outputs a web detection signal to the comparator 80. The web detection signal acts as a "stop" signal for the comparator 80 and this "stop" signal stops accumulation in the comparator 80 of pulses received from the pulse counter 70. Thus, after the emission of the "start" and "stop" signals, the comparator 80 contains a series of pulses, the number of which is representative of a particular distance which has been travelled by the web of paper 12 i.e. between detection of a particular pre-printed label 26 on the web of paper 12 and detection of a given point on the web of paper 12 upstream of the particular pre-printed label 26. In the comparator 80, the number of pulses is compared to a desired number of pulses, the latter being representative of a desired distance which has been travelled by the web of paper 12 in the period between the two detection signals. The comparison yields a difference signal, which may be positive or negative, and which is comprised of the number of pulses by which the compared number differs from the desired number. The difference signal is representative of the distance by which the web of paper 12 leads or lags the desired position of the web of paper 12 as a result of stretching or slackness of the web of paper 12. The difference signal comprising a number of positive or negative pulses, is outputted from the comparator 80 to the motor control 74 in which it is added arithmetically to the pulse signal from the ratio selector 72 and the feedback signal to form the pulsed motor control signal. Thus, the speed of the feed motor 26 is advanced or retarded in response to the difference in the actual position of the web of paper 12 at the detected location and the desired position.

When the label sensor 48 next detects a pre-printed label 26 on the web of paper 12, the pulse counter is again triggered to emit counted pulses to the comparator 80. The comparator 80 receives the counted pulses and the count is stopped when the web sensor 20 emits a web detection signal. The number of counted pulses is then again compared to the desired number and a difference signal is emitted to the motor control 74 which again acts to correct the speed of the feed motor 76. This cycle is then again repeated. Thus it will be seen that the feed motor 76 of the label delivery system 34 is continuously controlled in response to the detected position of the web of paper. This control ensures that the pre-printed labels 26 are accurately positioned on the web of paper 12 irrespective of any inadvertent stretching or slackness of the web of paper 12. In addition, when the web of paper 12 is pre-printed with a succession of images and the web sensor 20 detects a succession of printed marks on the web of paper 12, with each pre-printed label 26 being arranged to be deposited on the web of paper 12 in registration with a respective pre-printed image, the pre-printed labels 26 are accurately deposited relative to the pre-printed images irrespective of any variation in the distances between the pre-printed images which may have resulted from the printing of the web of paper 12 as a result of stretching of the web of paper 12 during the printing process.

In an alternative arrangement, the web sensor 20 is arranged to detect the rotational position of the die-cutting roller 52 instead of the web of paper 12. Since the die-cutting roller 52 is continuously in contact with the web of paper 12, the rotational position of the die-cutting roller is directly related to the translational position of the web of paper 12 thereunder. Thus detection of the rotational position of the die-cutting roller 52 indirectly results in the detection of the position of the web of paper 12.

Figure 3:
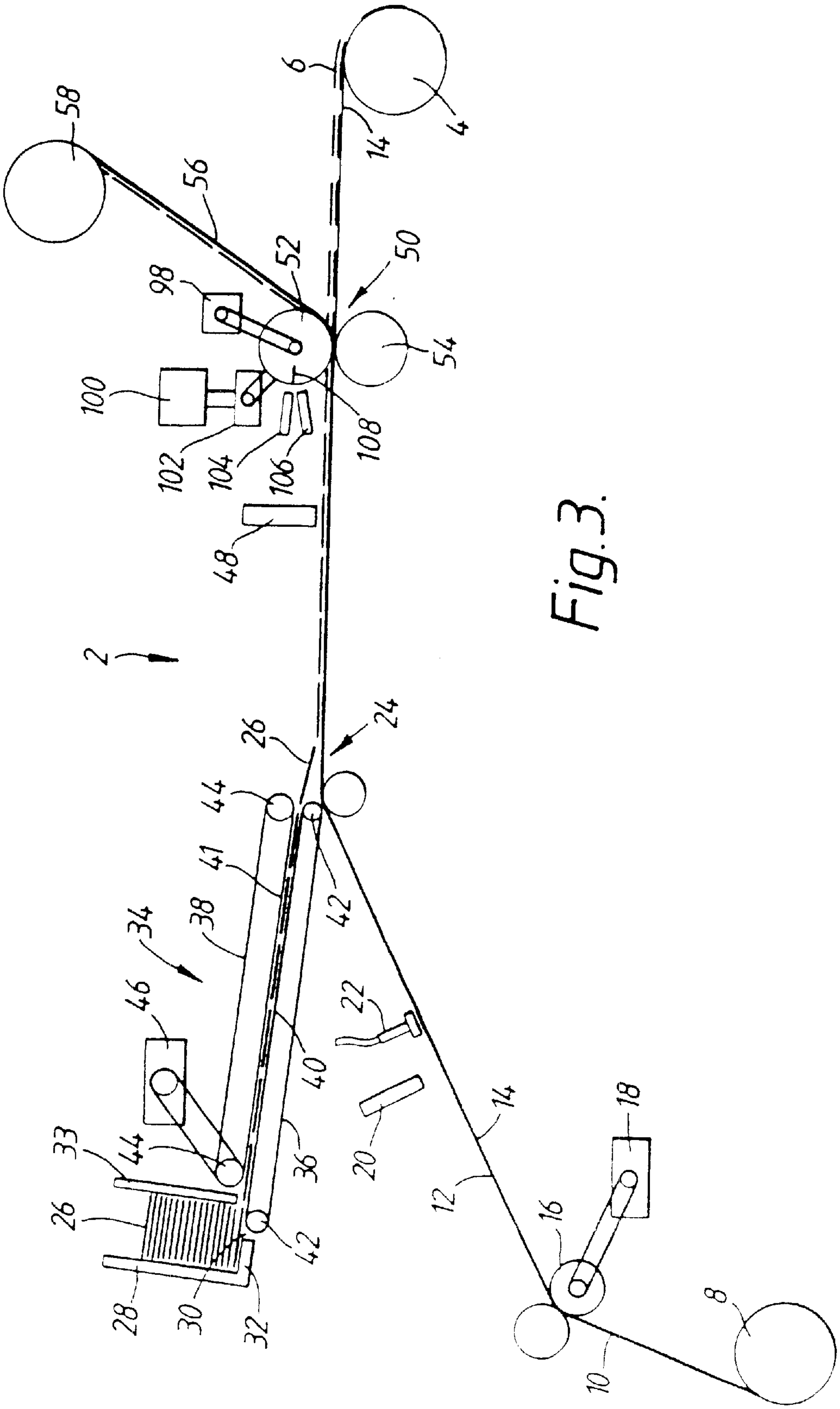
FIG. 3 is a schematic diagram of an apparatus for producing labels in accordance with a second embodiment of the present invention.
Figure 4:
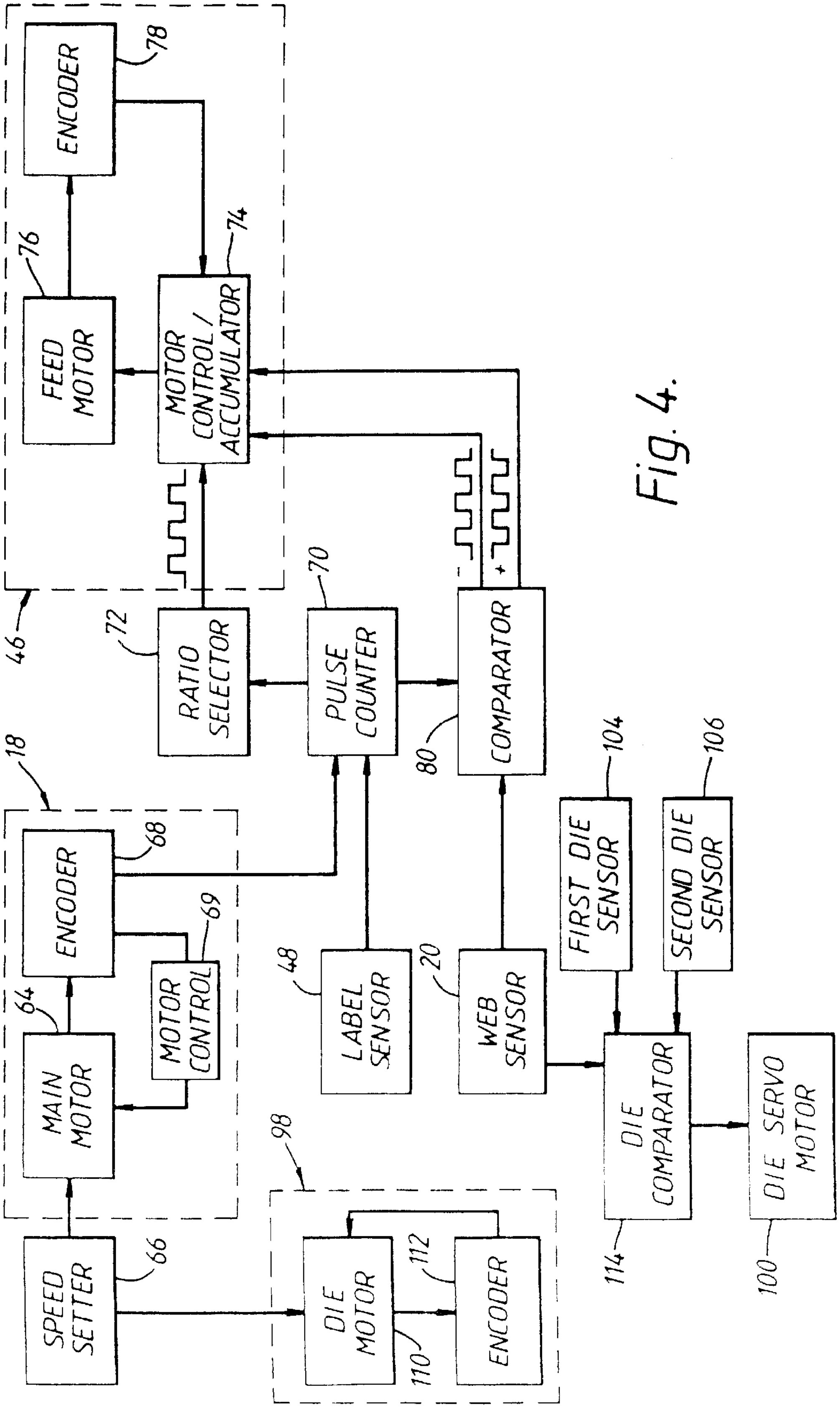
FIG. 4 is a schematic representation of the control system of the apparatus of FIG. 3.

A second embodiment of the present invention is shown in FIGS. 3 and 4. In this embodiment, as shown in FIG. 3, the label producing apparatus is broadly the same as that shown in FIG. 1, but with some modifications. Like parts are indicated by like reference numerals. Specifically, the die-cutting roller 52 is driven, at the same speed as that of the laminar material 10, by a die-cutter drive unit 98. In an alternative arrangement, the die-cutting roller 52 is driven by the main motor 64 through a shaft/gearbox arrangement. A die servo motor 100 is also coupled to the die-cutting roller 52 by way of a gearbox 102. The die servo motor 100 is controlled to advance or retard the die-cutting roller 52 depending on whether the actual position of the die-cutting roller 52 lags or leads the desired position which is required accurately to cut the self-adhesive labels 6. A pair of die-cutter sensors 104, 106 are located adjacent the die-cutting roller 52 and are adaptaed to detect a locating mark 108 on the die-cutting roller 52. The mark 108 passes the sensors 104, 106 every revolution of the die-cutting roller 52. The control system for the apparatus, including the die servo motor 100, is shown in FIG. 4.

Figure 2:
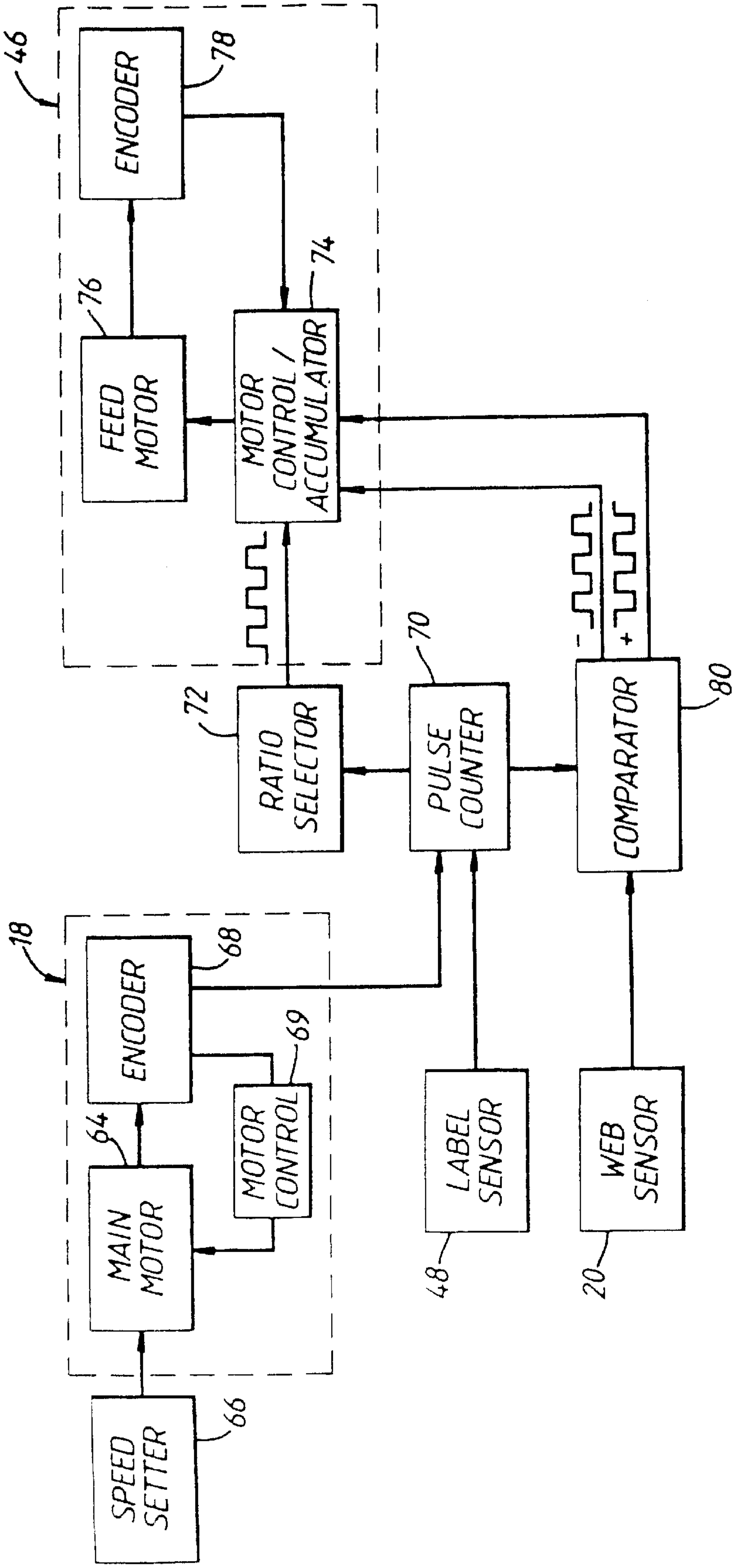
FIG. 2 is a schematic representation of the control system of the apparatus of FIG. 1.

FIG. 4 is similar to FIG. 2 and like parts are numbered with like reference numerals. The die-cutter drive unit 98 includes a die-cutter motor 110 and an encoder 112 which effects feedback control of the die-cutter motor 110 in a manner similar to that employed by the web drive unit 18. The speed of the die-cutter motor 110 is set by the speed setter 66. A die comparator 114 is provided which receives detection signals from the web sensor 20, and the pair of die-cutter sensors 104, 106. The output of the die comparator 114, which constitutes a servo-motor drive signal, is passed to the die servo motor 100.

The operation of those components of the control system of FIG. 4 which are also present in the control system of FIG. 2 is the same as described above in relation to the first embodiment of the present invention. The additional components of the control system of FIG. 4 act accurately to control the rotational position of the die-cutting roller 52 in relation to a desired position, which itself is related to the actual detected position of the web of paper 12. When the web sensor 20 detects a mark as described hereinabove, a web detection signal is passed to the die comparator 114 as well as to the comparator 80. The time of the web detection signal is representative of the position of a portion of the web 12 relative to the die-cutting roller 52. The pair of die-cutter sensors 104, 106 each in turn detect the locating mark 108 on the die-cutting roller 52 and each in turn passes a detection signal to the die comparator 114. The detection of signals from the die-cutting sensors 104, 106 are representative of the rotational position of the die-cutting roller 52. The control system is adapted to control the rotational position of the die-cutting roller 52 in relation to the desired position for the given position of the detected web portion. The time between the two detection signals from the two die-cutting sensors 104, 106 represents an acceptable error period over which the die-cutting roller 52 may lead or lag the desired position. This in turn represents a distance error in the resultant label. The time of the web detection signal is compared to the times of the two die detection signals. If the web detection signal lies between, or on either of, the two die detection signals, the die-cutting roller 52 is within acceptable error margins and no error correction is made. However, if the web detection signal is outside the two die detection signals, the die comparator 114 issues an error correction signal to the die servo motor 100 which acts, through the gearbox 102, to advance or delay the die-cutting roller 52 by an amount which is directly related to the size of the positional error of the die-cutting roller 52. In this way, the resultant labels 6 are accurately cut out in registration with the pre-printed images on the web of paper 12 since the die-cutting roller 52 is intermittently controlled so that it is in correct rotational orientation for each die-cut to be made. The control system may be arranged so that when the web sensor 20 detects a mark on the web of paper 12, the rotational position of the die-cutting roller is corrected either immediately, in which case the die-cutting roller 52 is corrected to cut out a label 6 downstream of the label image associated with the detected mark, or after a delay, in which case the die-cutting roller 52 is corrected for the cutting of that same label 6 which is associated with the detected mark. The rotational position of the die-cutting roller 52 can be corrected for each rotation of the die-cutting roller 52 and/or for every label 6.

Figure 5:
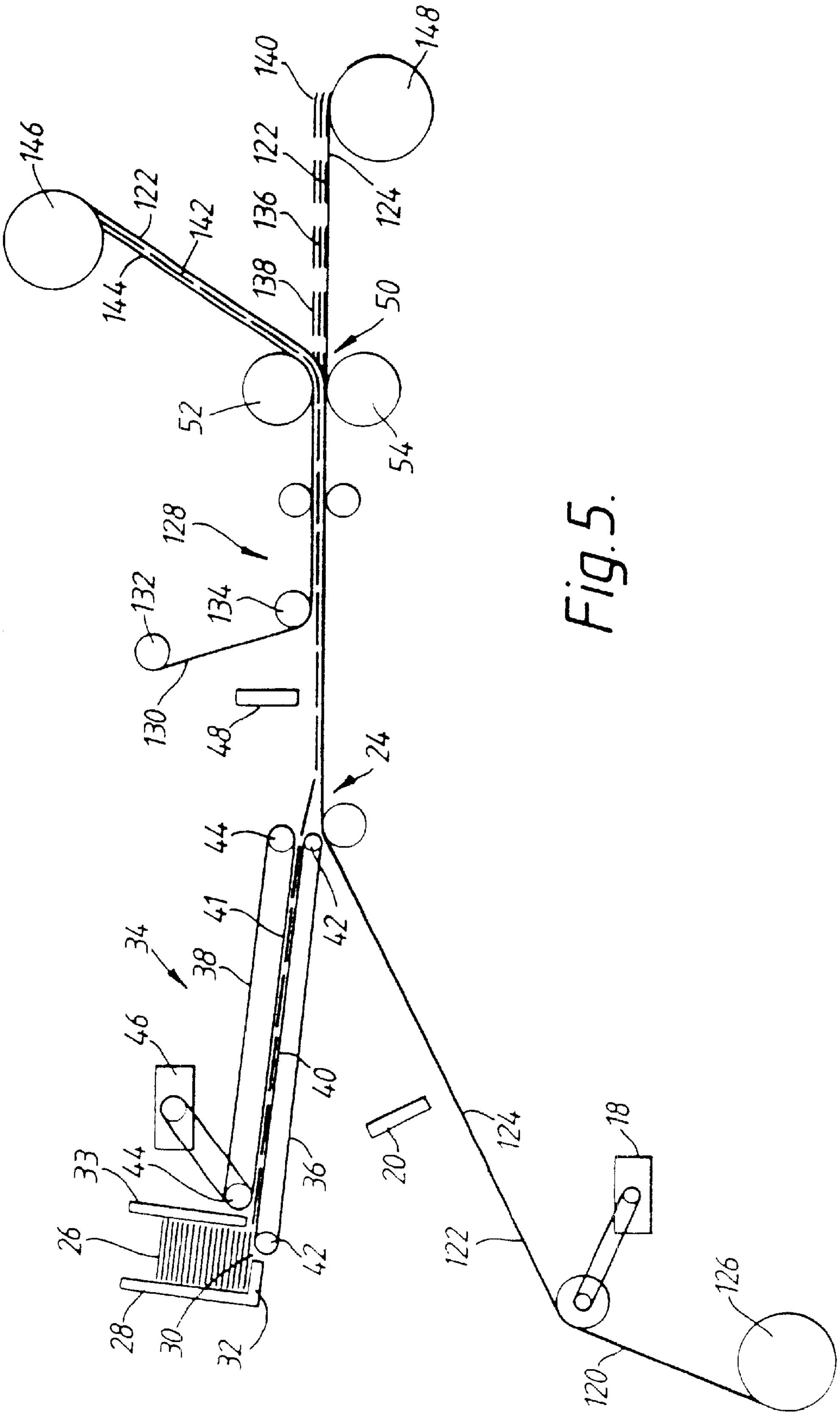
FIG. 5 is a schematic diagram of an apparatus for producing labels in accordance with a third embodiment of the present invention.

FIG. 5 shows a further embodiment of the present invention. In this embodiment, the laminar material 120 consists of a layer of pressure-sensitive adhesive 122 carried on a release backing material 124. A reel 126 of the laminar material 120 is fed out past the web sensor 20 to the label applying station 24 at which a succession of pre-printed labels 26 is deposited directly onto the layer of pressure-sensitive adhesive 122. The label delivery system 34 operates as described hereinabove with reference to FIGS. 1 and 3. The composite web then passes under the label detector 48.

The assembly of labels 26 on the release material 124 is then passed to laminar material applying station 128 at which a laminar material 130, which is coated on one side with a pressure-sensitive adhesive or, alternatively, by a permanent adhesive, is fed out from a reel 132 thereof to a roller 134. Generally, the self-adhesive laminar material 130 is carried on a length of release backing material (not shown) and as the composite web of release backing material/release backing material is fed out from the reel 132 the release backing material is stripped away from the self-adhesive surface of the laminar material 130. Preferably, the laminar material 130 is a layer of transparent self-adhesive plastics material, such as polyester, a low density polyethylene, or polypropylene, and is typically in a thickness of around 12 microns. That surface of the laminar material 130 which is coated with the pressure-sensitive adhesive is remote from the roller 134 and the other surface is disposed against the roller 134. The roller 134 is positioned so that it urges the pressure-sensitive adhesive surface of the laminar material 130 against the upper surface of the assembly of the labels 26 and the release material 124 whereby the laminar material 130 is adhered thereto. The composite assembly then passed to the die-cutting station 50. The assembly passes between the die-cutting roller 52 and the backing roller 54. The die-cutting roller 52 is adapted to cut through the laminar material 130, the adhered labels 26 and the layer of pressure-sensitive adhesive 128 as far as the release material 124 so as to cut from each adhered label 26 a central self-adhesive label 136 of required shape and dimensions which is covered by a coextensive laminar material 138 and is carried on the release material 124. Thus the die-cutter 52 cuts a succession of self-adhesive labels 140 which are carried on the release material 124. Each die-cut label 140 is surrounded by a peripheral, label waste portion 142 and a waste remnant 144 of the web of laminar material.

Waste material, consisting of the waste portions 142 and the waste remnant 144 to which the waste portions 142 are adhered by the self-adhesive surface of the laminar material 130, are removed from the release material 124 thereby to leave a succession of self-adhesive labels 140 on the release material 124. Each self-adhesive label 140 consists of a three ply laminate of laminar material 138/label 136/layer or pressure-sensitive adhesive 122. The waste material is pulled upwardly away from the release material 124. As the waste laminar material 144 is separated from the release material 124, the pressure-sensitive adhesive-coated surface of the laminar material 144 pulls the adjacent layer of pressure-sensitive adhesive 122 away from the release material 124 also since the layer of pressure-sensitive adhesive 122 has greater adhesion of the pressure-sensitive adhesive-coated surface of the laminar material 144 than to the release material 124. Similarly and for the same reason the peripheral label waste portions 142 pull the adjacent layer of pressure-sensitive adhesive 122 away from the release material 124. Accordingly, the resultant self-adhesive labels 140 on the release material 124 are not surrounded by the layer of pressure-sensitive adhesive 122 since those parts of that layer 122 which surround the self-adhesive labels 140 have been removed from the release material 124 in the waste removal step. The waste consists of the waste remnant 144 of the laminar material, the peripheral label waste portions 142 and those parts of the layer of pressure-sensitive adhesive 122 which are adjacent thereto. The waste is wound onto a reel 146 for subsequent disposal. The release material 124 with the succession of self-adhesive labels 140 thereon is also wound into a reel 148 which can be subsequently placed in an automatic labelling apparatus for automatic application of the self-adhesive labels 140 to products to be labelled.

The control system operates similarly to that of the first illustrated embodiments of the present invention. The web sensor 20 detects a series of marks on the release material 124, and the label sensor 48 detects pre-printed labels 26 on the release material 124. This enables accurate deposition of the pre-printed labels 26 onto the pressure-sensitive adhesive layer 122 on the laminar material. Furthermore, the apparatus may be provided with a "die-cnasing" mechanism, such as that described in FIGS. 3 and 4, which ensures accurate operation of the die-cutting roller 52. If desired, the die servo motor 100 may be controlled in response to a detection signal from the label sensor 48 rather than the web sensor 20.

Figure 6:
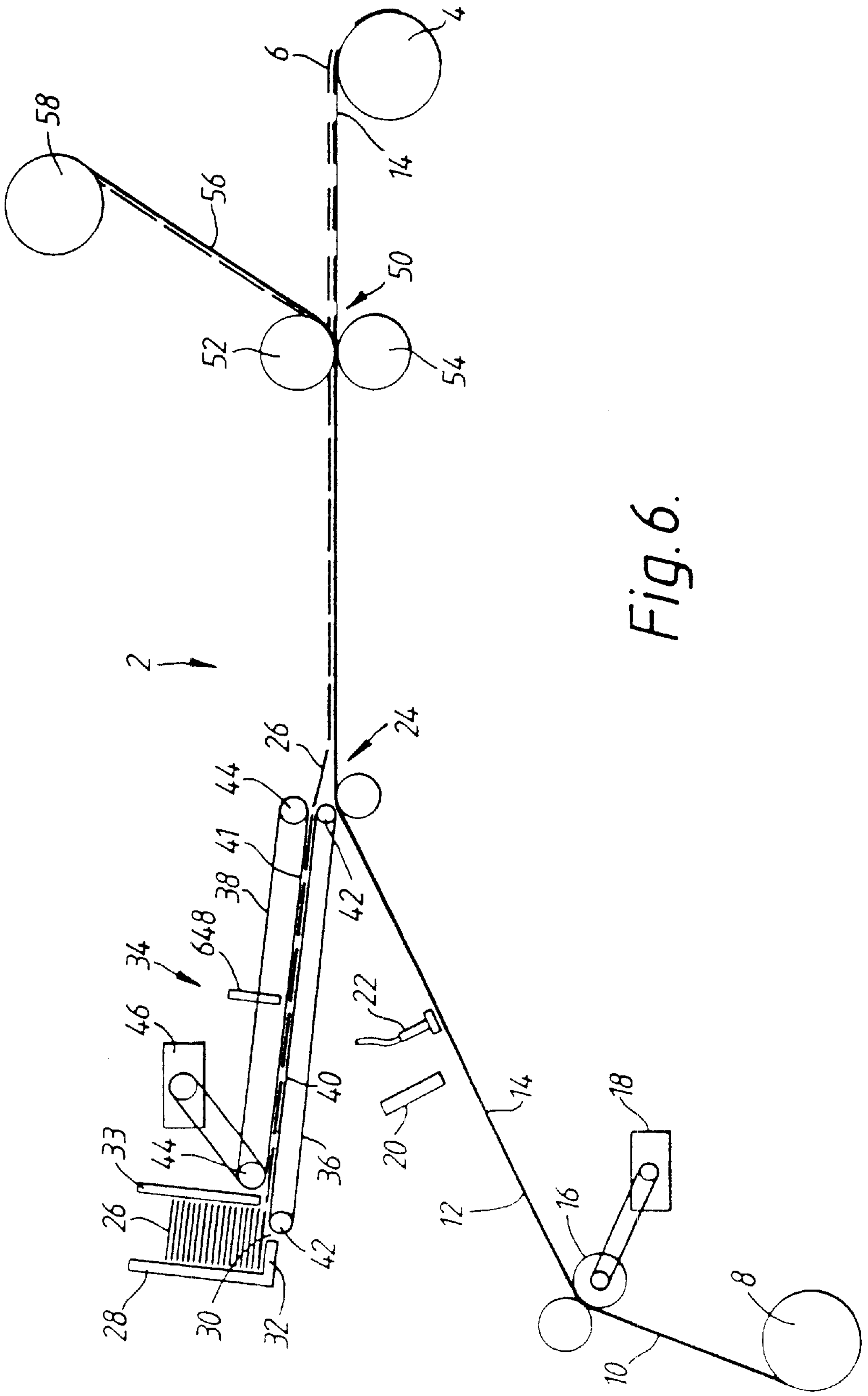
FIG. 6 is a schematic diagram of an apparatus for producing labels in accordance with a fourth embodiment of the present invention.

A fourth embodiment of the present invention is shown in FIG. 6 which illustrates a label producing apparatus which is similar to that shown in FIG. 1 but in which the location of the label sensor is different. Like parts are numbered by like reference numerals. In the embodiment of FIG. 6, the label sensor 648 is located upstream of the label applying station 24 and is arranged to detect the position of pre-printed labels 26 before they have been deposited onto the laminar material 10. The label sensor 648 is adapted to detect a printed reference on each pre-printed label 26. The control system of FIG. 2 is also employed with the apparatus of FIG. 6. When a pre-printed label 26 is detected by the label sensor 648, a label detection signal is outputted to the pulse counter 70. In the manner described hereinbefore with reference to FIGS. 1 and 2, the feed motor 76 of the label delivery system is advanced or retarded depending upon whether or not the detected pre-printed label 26 lags or leads the desired position. In this way, the detected pre-printed label 26 can be accurately deposited onto the moving laminar material 10. The position of the pre-printed label 26 is adjusted before it is applied to the laminar material 10. Thus the pre-printed label 26 can always be in the current position for accurate deposition on the laminar material 10 irrespective of the position of the succeeding or preceeding pre-printed label, or labels, 26.

It should be understood that in the embodiments of FIGS. 3 and 4 and FIG. 5, the label sensor may be located upstream of the label applying station in the manner shown in FIG. 6.

What I claim is:

1. A method of producing a succession of self-adhesive labels carried on a length of release backing material, the method comprising the steps of:

(a) providing a laminar material which includes a release backing material as a lower layer and an upper layer comprised of a web of self-adhesive backed material or a layer of pressure-sensitive adhesive;

(b) depositing a succession of pre-printed labels onto the upper layer of the laminar material and adhering the pre-printed labels thereto, the laminar material being conveyed past a label applying station; and (c) cutting through the upper layer of the laminar material as far as the release backing material thereby to form the required self-adhesive labels; wherein the rate of deposition of the pre-printed labels onto the upper layer is controlled by detecting the position of pre-printed labels, comparing the detected position with a desired position of the pre-printed labels and changing the said rate of deposition in response to that comparison, wherein the pre-printed labels are detected after they have been deposited onto the laminar material.

2. A method according to claim 1 wherein the desired position of each pre-printed label is related to the position of a respective one of a succession of particular locations on the laminar material.

3. A method according to claim 2 wherein the succession of particular locations on the laminar material are detected, and wherein when the position of a pre-printed label is detected a label detection signal is produced, and when one of the particular locations on the laminar material is next detected, a laminar material detection signal is produced, the two detection signals are processed to yield an error signal which is related to the distance with the detected pre-printed label leads or lags the desired position and the error signal is employed to retard or advance the rate of deposition of the pre-printed labels.

4. A method according to claim 3 wherein the label detection signal is employed to initiate the count of a series of pulses which represent distance travelled by the laminar material, the laminar material detection signal is employed to stop that count, and the counted number of pulses is compared to a particular number of pulses to yield a difference signal which comprises the error signal.

5. A method according to claim 1 wherein the cutting is carried out by a die-cutting roller which is continuously driven, and the rotational position of the die-cutting roller is periodically advanced or retarded by means of a servo motor, the servo motor being controlled in response to a die error signal which is produced by comparing the actual rotational position of the die-cutting roller with a desired position.

6. An apparatus for producing a succession of self-adhesive labels carried on a length of release backing material, the apparatus comprising means for depositing at a label applying station a succession of pre-printed labels onto the upper surface of a laminar material, which includes a lower layer of a release backing material and an upper layer comprised of a web of self-adhesive backed material or a layer of pressure-sensitive adhesive, the pre-printed labels being adhered to the laminar material, means for conveying the laminar material past the label applying station, a cutting device for cutting through the upper layer of the laminar material as far as the release backing material thereby to form the required self-adhesive labels, means for detecting the position of pre-printed labels, means for comparing the detected position with a desired position of the pre-printed labels, means for controlling the said depositing means in response to the means for comparing thereby to change the rate of deposition of the pre-printed labels onto the upper layer, wherein the detecting means is located downstream of the label applying station and the detecting means is arranged to detect the position of pre-printed labels after they have been deposited onto the laminar material.

7. An apparatus according to claim 6 further comprising a second detecting means for detecting a succession of particular locations on the laminar material, the desired position of each pre-printed label being related to the position of a respective one of the succession of particular locations.

8. An apparatus according to claim 7 wherein the first detecting means is arranged to produce a label detection signal when the position of a pre-printed label is detected, and when the second detecting means next detects one of the particular locations on the laminar material, a laminar material detection signal is produced, the apparatus further comprising means for processing the said two signals to yield an error signal which is related to the distance which the detected pre-printed label leads or lags the desired position and a control means which employs the error signal to retard or advance the rate of deposition of the pre-printed labels by the depositing means.

9. An apparatus according to claim 8 wherein the processing means comprises means for counting a series of pulses which represent distance travelled by the laminar material, the label detection signal and the laminar material detection signals being employed to initiate and to stop the count, respectively, and means for comparing the counted number of pulses with a particular number of pulses to yield a difference signal which comprises the error signal.

10. An apparatus according to claim 6 wherein the cutting device is a die-cutting roller which is continuously driven, the apparatus further comprising a servo motor which is operable periodically to advance or retard the rotational position of the die-cutting roller and means for comparing the actual rotational position of the die-cutting roller with a desired position to produce a die error signal which is employed to control the servo motor.

* * * * *